April 3, 1956  J. C. COLLINS  2,740,214
GRADER BLADE MOUNTING
Filed Nov. 10, 1952  3 Sheets-Sheet 1

INVENTOR
Johnnie C. Collins

BY *Ahley & Ahley*
ATTORNEYS

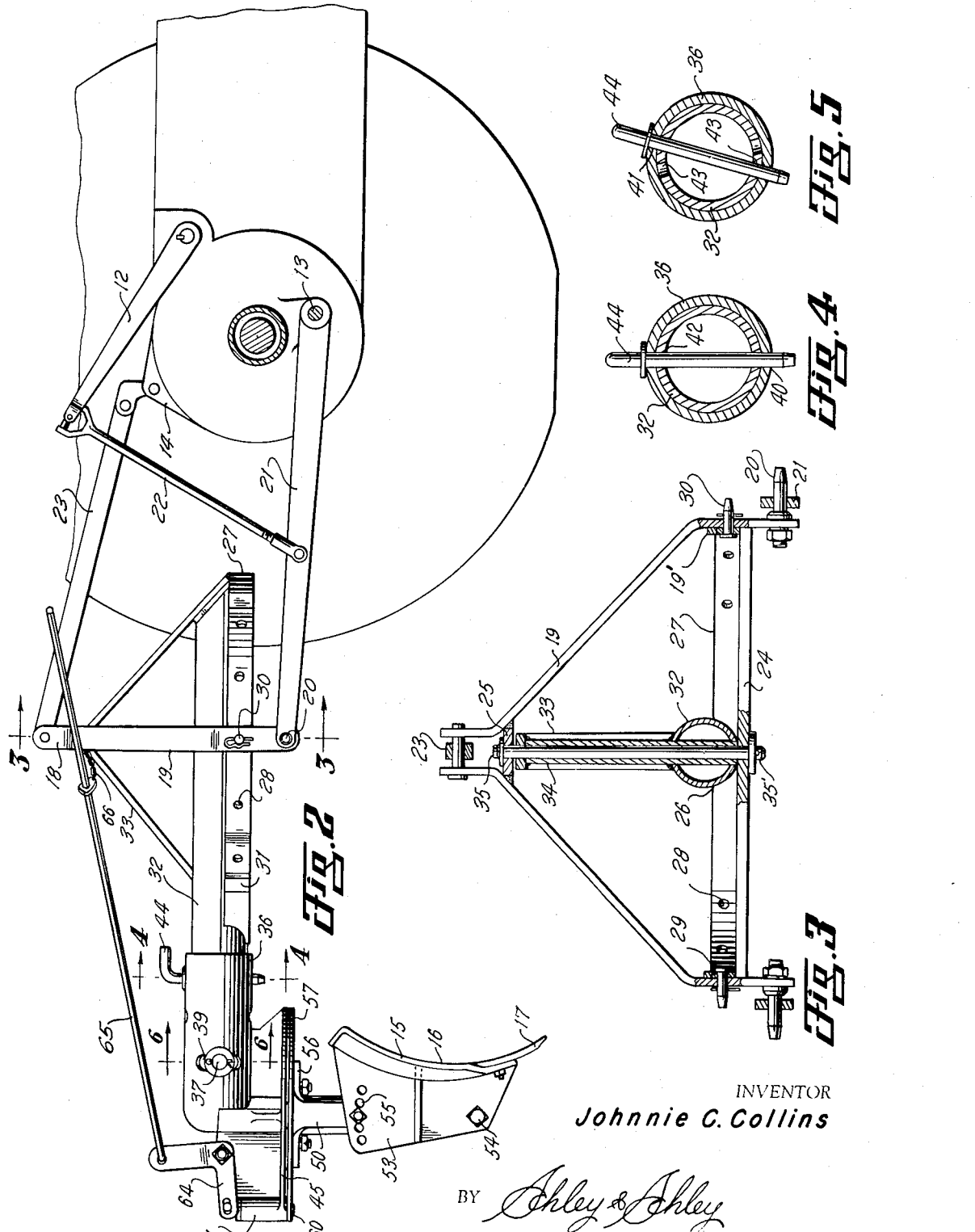

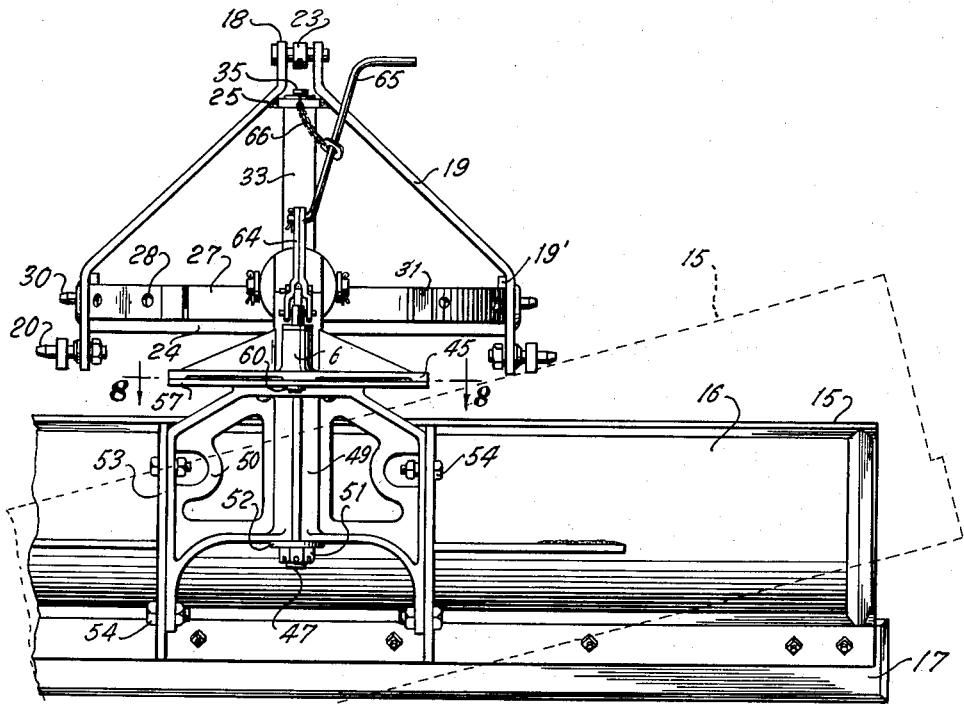
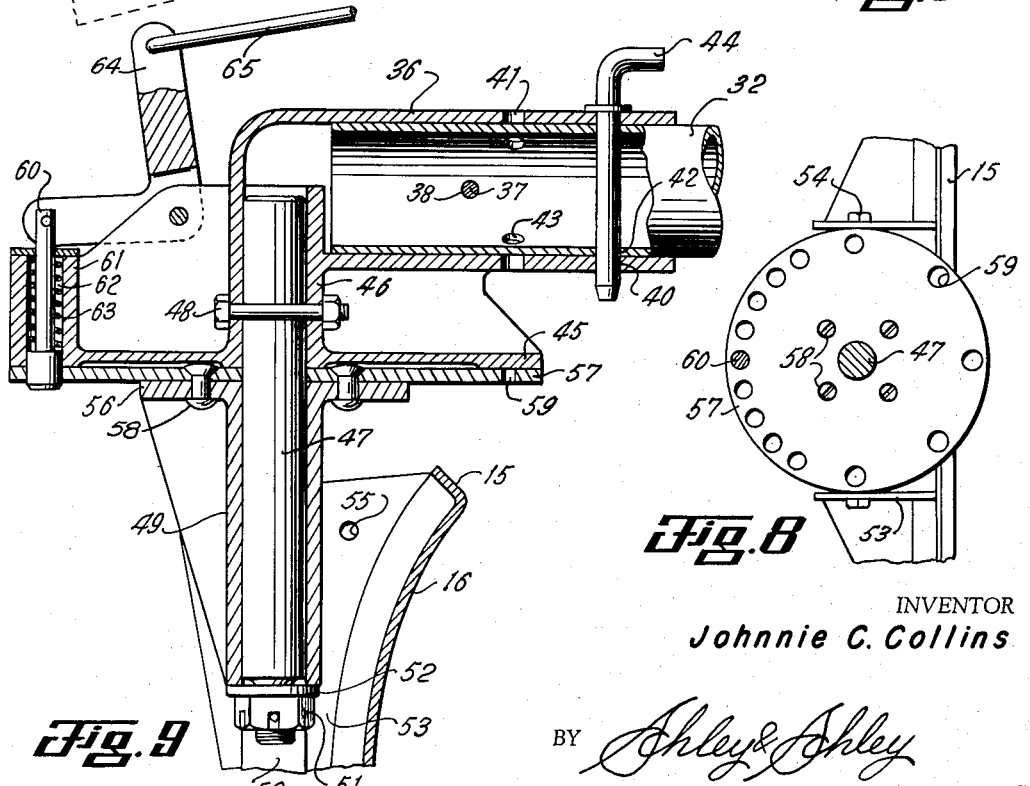

United States Patent Office

2,740,214
Patented Apr. 3, 1956

2,740,214

GRADER BLADE MOUNTING

Johnnie C. Collins, Dallas, Tex., assignor to Servis Equipment Company, Dallas, Tex.

Application November 10, 1952, Serial No. 319,713

6 Claims. (Cl. 37—156)

This invention relates to new and useful improvements in grader blade mountings.

One object of the invention is to provide an improved mounting which is so constructed that a grader or scraper blade may be supported for pivotal movement about upright axes to vary its angular adjustment and relation.

Another object of the invention is to provide an improved adjustable mounting for a grader blade adapted to be connected to the rear lift of a tractor and having novel means supporting the blade for transverse pivotal movement about upright axes whereby said blade may be swung relative to its mounting and to the tractor for relatively minute transverse adjustment.

A further object of the invention is to provide an improved grader blade mounting, of the character described, which includes a frame connectable to the tractor lift and having rotatable blade supporting means mounted thereon and fastened in adjusted positions, the blade being adjustably connected to the supporting means for relative rotation whereby said blade may be readily pivoted relative to said means as well as swung transversely of the frame to vary its angular position and relation to said frame.

A construction designed to carry out the invention will be hereinafter described together with other features of the invention.

Figure 1:
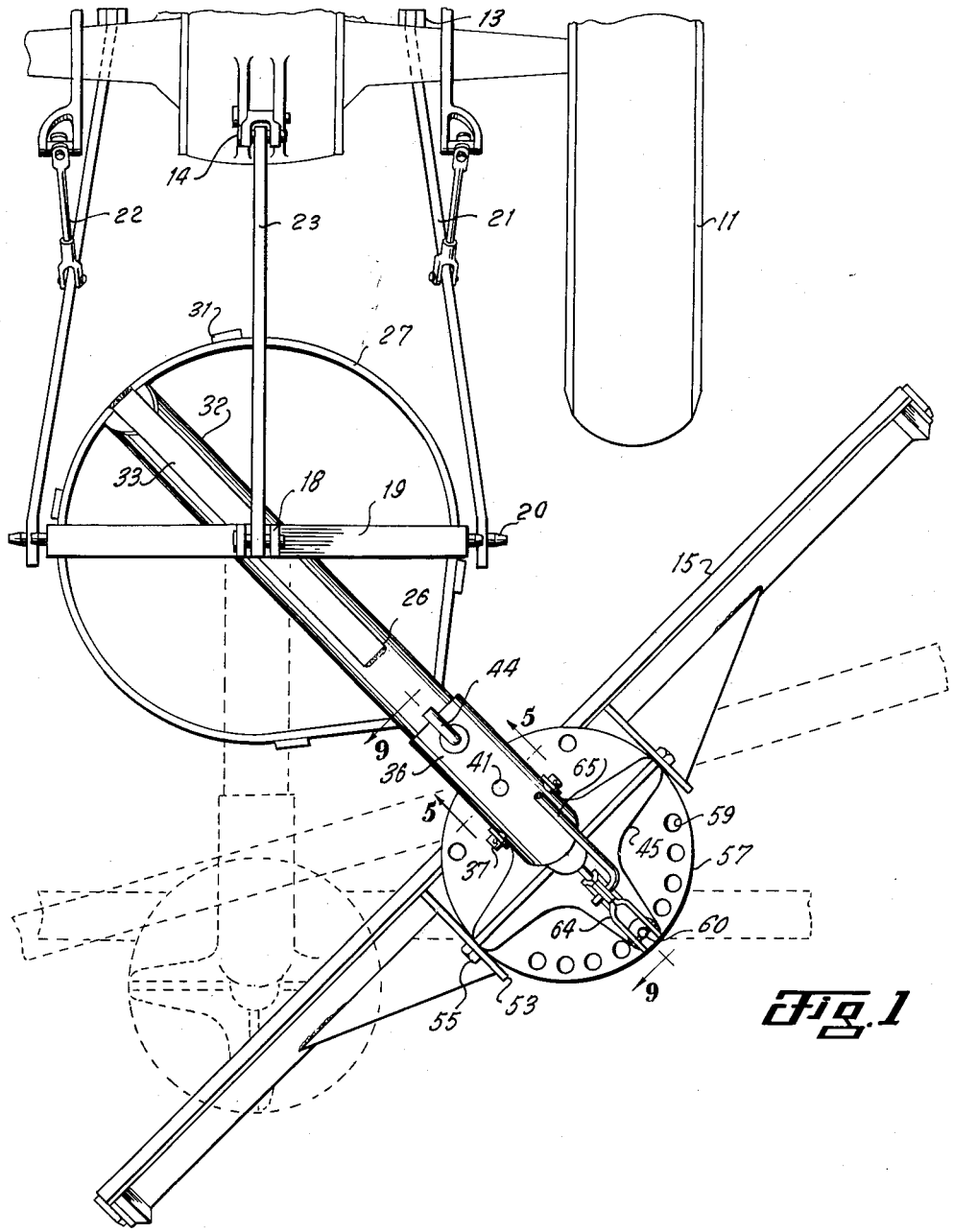
Figure 6:
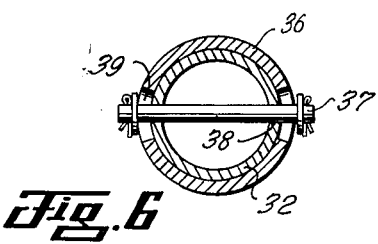

The invention will be more readily understood from a reading of the following specification and by reference to the accompanying drawings, wherein an example of the invention shown, and wherein:

Fig. 1 is a top plan view of a mounting constructed in accordance with the invention and shown supporting a grader blade from the rear lift of a tractor, Fig. 2 is a side elevational view, partly in section, of the mounting, blade and tractor lift, Fig. 3 is a transverse, vertical, sectional view, taken on the line 3—3 of Fig. 2, showing one of the upright pivotal supports of the mounting, Fig. 4 is a transverse, vertical, sectional view, taken on the line 4—4 of Fig. 2, showing a horizontal or tilting support for the blade, Fig. 5 is a transverse, vertical, sectional view, taken on the line 5—5 of Fig. 2, showing an adjusted position of the horizontal support of Fig. 1, Fig. 6 is a transverse, vertical, sectional view, taken on the line 6—6 of Fig. 2, Fig. 7 is a rear elevational view of the mounting and blade, Fig. 8 is a horizontal, cross-sectional view, taken on the line 8—8 of Fig. 7, showing the other upright pivotal support, and Fig. 9 is a longitudinal, vertical, sectional view, taken on the line 9—9 of Fig. 1, showing the horizontal support of Figs. 4 and 5 and the upright pivotal support of Fig. 8.

In the drawings, the numeral 10 designates the rear portion of a tractor having ground wheels 11 and a power lift mechanism which is conventional and which includes levers 12, draw bar pivots 13 and intermediate hitch lugs 14. A grader or scraper blade 15, having a mold board 16 and a replaceable cutting edge 17, is adapted to be attached to the tractor 10 by an adjustable mounting 18 for terracing and ditching operations. The mounting 18 includes an upright, transversely spread main frame or A-frame 19 having external pivot pins 20 at the lower ends of its legs attached by a pair of arms 21 to the draw bar pivots 13. A pair of links 22 pivotally connect the intermediate portions of the arms 21 to the levers 12, and the upper end of the A-frame is pivotally connected to the hitch lugs 14 by a suitable link 23. Thus, the A-frame is adapted to be maintained substantially upright by the link 23 upon being raised and lowered by the lift levers.

A horizontal, flat cross bar or member 24 extends transversely between the lower ends of the A-frame legs, while a similar short cross bar or member 25 connects the upper ends of said legs and coacts with the lower bar to provide a support for a sub-frame 26 (Fig. 3). The latter includes a substantially circular and preferably annular, horizontal base or collar member 27 resting upon the lower bar 24 and having a plurality of apertures 28 for registering with similar apertures 29 formed in the A-frame legs. A pair of suitable pins 30 are adapted to be fastened in the registered apertures 28 and 29 for securing the sub-frame 26 and its base 27 in rotatably adjusted portions between external stop lugs 31 carried by said base. Displacement of the base is prevented by retaining lugs 19' on the inner surfaces of the A-frame legs above said base. Overlying and secured to the base is a horizontal, diametrically-extending sleeve or tubular member 32 having an upright triangular brace frame 33 secured to and projecting upwardly therefrom. The apex of the brace frame 33 terminates below and in alinement with the upper bar 25 and is flattened for welding or other attachment to the upper end of an alined supporting tube 34 which has its lower end extending through and secured to the sleeve 32. A rod 35, carrying cotter pins 35' on its ends, extends through and connects the brace frame 33 and tube 34 to the bars 24 and 25 whereby the sub-frame 26 is rotatably supported for horizontal pivotal movement about the upright axis of the main frame 19 and the rod 35.

The sleeve 32 projects rearwardly beyond the base 27 and said base is extended rearwardly to support the projecting sleeve portion. An angular, tubular bracket 36 is telescopingly engaged upon the rear end of the sleeve and is rotatably fastened thereto by a suitable transverse pin 37 extending through diametric openings 38 formed in said sleeve and registering upright or circumferential slots 39 in the horizontal, telescoping portion of the bracket (Fig. 6). For securing the bracket 36 in rotatably adjusted positions, two pairs of diametric openings 40 and 41 are provided in the horizontal bracket portion in upright, parallel, longitudinally-spaced relation (Fig. 9). The sleeve has similar diametric openings 42 and 43 adapted to be registered with the bracket openings 40 and 41, respectively, for removable engagement by a suitable lock pin 44 (Figs. 4 and 5). It is noted that there are two pairs of the openings 43 and that said openings are disposed in the same diametric or transverse plane and in angular relation to the openings 42. Thus, the bracket may be fastened in clockwise and counter-clockwise rotatably adjusted positions by turning said bracket relative to the sleeve so as to move the desired openings into registration for receiving the pin 44. As will be apparent hereinafter and as shown in dotted lines in Fig. 7, this adjustment pivots or tilts the blade 15 transversely in an arc about the longitudinal axis of the sleeve 32.

A horizontal spider 45 is made integral with the depending portion of the angular bracket 36 and has an axial, upstanding collar or hub 46 for receiving the upper end of an upright, cylindrical post or shaft 47. As shown in Figs. 7 and 9, the post 47 is secured to the hub 46 of a diametric bolt 48 and depends below the spider 45 to rotatably support a tubular bearing 49, in the form of a collar or sleeve, made integral with the medial portion of a yoke-shaped bracket or hanger 50. A nut 51 is screw-threaded upon the lower end of the post for rotatably confining the bracket 50 upon the post, a washer 52 being interposed between the bearing sleeve and nut. The bracket has its upright, lateral margins adjustably fastened to and between a pair of flat brackets or plates 53 projecting rearwardly from the mold board 16 by suitable bolts 54. A plurality of openings 55 are formed in a horizontal arc in the upper portion of each plate bracket 53 for selectively receiving the upper bolts 54 and permitting tilting adjustment of the blade 15 about the horizontal axis of the lower bolts.

At the upper end of the bearing sleeve 49, a radial flange 56 is provided for supporting a horizontal, circular plate 57 underlying the spider 45 and secured to the flange by countersunk rivets 58 (Fig. 9). Since the plate 57 is rotatably confined upon the post 47 by the bearing sleeve and since the spider is secured to said post by the bolt 48, said plate may be rotated with said bearing sleeve relative to said post and spider. As a result, the blade 15 is supported for rotation relative to the angular bracket 36 in an arc about the upright axis of the post. For securing the blade in adjusted positions, a plurality of circumferentially-spaced apertures 59 are formed in the plate 57 adjacent its periphery for selective engagement by a spring-pressed lock pin or plunger 60. One of the arms of the spider, preferably the rear arm, is provided with an upstanding boss or housing 61 having a cylindrical bore 62 extending through said arm for receiving the pin 60 and its spring 63. An upright bell crank 64, pivotally mounted on the arm, pivotally connects the upper end of the pin to an operating lever 65 which is supported by a suitable chain 66 extending from the upper end of the rod 35. Obviously, the lock pin is raised out of engagement with the aperture 59 of the plate 57 upon forward movement of the lever 65 and bell crank 64, whereby said plate may be rotated relative to the spider 45 about their common axis for moving the blade to an adjusted position as shown in dotted lines in Fig. 1. Upon release of the lever, the force of the spring 63 urges the pin downwardly into engagement with the selected aperture.

As has been explained, the transverse pin 37 and coacting openings 38 and slots 39 permit tilting of the blade in an arc about the longitudinal axis of the sleeve 32 for raising and lowering the ends of said blade as shown in dotted lines in Fig. 7. The lock pin 44 and coacting openings 40, 41, 42 and 43 fasten the blade in its adjusted positions relative to the sleeve. Forward and rearward inclination or tilting of the blade in an arc about the axis of the lower bolts 54 is controlled by the adjustment of the upper bolts 54 relative to the openings 55 of the plate brackets 53. Due to the provision of the mounting 18 and its pivotal support of the sub-frame 26, the blade is adapted to be swung laterally or transversely of the tractor. The transverse angular relation of the blade to the tractor may be varied as desired, in addition to or irrespective of the lateral pivoting of said blade, by rotating the plate 57 relative to the spider 45 about the longitudinal axis of the post 47. Thus, relatively minute adjustment of the transverse angular relation of the blade may be obtained. It is noted that this mounting of the blade for pivotal movement about a pair of upright axes is of primary importance because it permits positioning of the forward end of the blade immediately behind and in alinement with either wheel of the tractor, whereby terracing and ditching operations are facilitated. Of course, this dual pivotal mounting is provided by the pivotal supporting of the sub-frame and the pivotal suspension of the blade from said sub-frame.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A mounting for pivotally supporting a grader blade for movement about a pair of spaced upright axes including a transversely spread main frame having a substantially upright pivot, a sub-frame rotatably mounted on the pivot for movement about its axis, the sub-frame having a substantially circular base attached to the main frame against rotation in adjusted positions of said sub-frame, a member extending from said sub-frame beyond said main frame, and a grader blade pivotally supported at the outer end of the member for rotation about an upright axis spaced from the axis of rotation of said sub-frame whereby the blade may undergo pivotal movement relative to said sub-frame and therewith relative to said main frame.

2. A grader blade mounting as set forth in claim 1 wherein the main frame includes a cross bar supporting its pivot and the base of the sub-frame, said sub-frame having an upright portion rotatably mounted upon the pivot.

3. A mounting for attaching a grader blade to a tractor including, a substantially upright A-frame having spaced cross bars, a sub-frame having an upright portion mounted between the cross bars for rotation about the upright axis of the A-frame, means fastening the sub-frame to said A-frame against rotation in adjusted positions, said sub-frame having a horizontal rearwardly extending member, a substantially upright post suspended from the rear portion of the member in spaced relation to said A-frame, a grader blade mounted at its medial portion on the post for rotation about its axis whereby the blade may undergo pivotal movement relative to the sub-frame and therewith relative to said A-frame about spaced upright axes, and means locking said blade in adjusted positions against rotation on said post relative to said sub-frame.

4. A mounting for pivotally supporting a grader blade for swinging movement about a pair of spaced upright axes including, a substantially upright transversely spread main frame having a pair of spaced superposed cross bars, a sub-frame having a substantially annular base and an upright portion rotatably mounted between the cross bars, the sub-frame being attached to the main frame in adjusted positions against rotation, a member carried by and extending rearwardly from the base beyond the main frame, a substantially upright pivot post depending from the rear portion of the member in spaced relation to said main frame, and a grader blade rotatably mounted intermediate its ends on the post whereby the blade may undergo pivotal movement relative to the sub-frame and therewith relative to said main frame.

5. A grader blade mounting as set forth in claim 4 including, fastening means securing the substantially annular base of the sub-frame to the main frame in adjusted positions against rotation, and locking means securing the blade to the member in adjusted positions against pivotal movement relative to said sub-frame.

6. A mounting for attaching a grader blade to a tractor including, a substantially upright A-frame having spaced cross bars, a sub-frame having a substantially annular base and an upright portion mounted between the cross bars for rotation about the upright axis of the A-frame, means fastening the base to said A-frame against rotation in adjusted positions of the sub-frame, a horizontal member extending rearwardly from the base, a substantially upright post suspended from the rear portion of the member in spaced relation to said A-frame, a grader blade mounted at its medial portion on the post for rotation about its axis whereby the blade may undergo pivotal movement relative to the sub-frame and therewith relative to said A-frame about spaced upright axes, and means locking said blade in adjusted positions against rotation on said post relative to said sub-frame.

References Cited in the file of this patent

UNITED STATES PATENTS

| | | |
|---|---|---|
| 1,540,161 | Callison et al. | June 2, 1925 |
| 2,256,214 | Owen | Sept. 16, 1941 |
| 2,320,141 | Kott | Mar. 25, 1943 |
| 2,333,837 | Wibbels | Nov. 9, 1943 |
| 2,506,759 | Wommer | May 9, 1950 |
| 2,560,711 | Arps | July 17, 1951 |
| 2,685,240 | Wilson et al. | Aug. 3, 1954 |